United States Patent
Salerno

(10) Patent No.: US 7,432,695 B2
(45) Date of Patent: Oct. 7, 2008

(54) ADAPTIVE POWER CONTROL FOR HYSTERETIC REGULATORS

(75) Inventor: David Charles Salerno, New Boston, NH (US)

(73) Assignee: Linear Technology Corporation, Milpitas, CA (US)

( * ) Notice: Subject to any disclaimer, the term of this patent is extended or adjusted under 35 U.S.C. 154(b) by 185 days.

(21) Appl. No.: 11/107,739

(22) Filed: Apr. 18, 2005

(65) Prior Publication Data
US 2006/0232256 A1    Oct. 19, 2006

(51) Int. Cl.
*G05F 1/40*    (2006.01)
(52) U.S. Cl. .................. 323/284; 323/288; 323/277
(58) Field of Classification Search ........... 323/222, 323/315, 282, 284, 288, 276, 277
See application file for complete search history.

(56) References Cited

U.S. PATENT DOCUMENTS

| | | | |
|---|---|---|---|
| 5,548,206 A | | 8/1996 | Soo |
| 6,204,646 B1 * | | 3/2001 | Hiramatsu et al. ......... 323/282 |
| 6,294,903 B1 | | 9/2001 | Yamashita et al. |
| 6,304,066 B1 | | 10/2001 | Wilcox et al. |
| 6,498,466 B1 * | | 12/2002 | Edwards ..................... 323/282 |
| 6,847,231 B2 * | | 1/2005 | Kinugawa et al. ........... 323/282 |
| 7,030,596 B1 * | | 4/2006 | Salerno et al. .............. 323/282 |
| 2003/0107356 A1 | | 6/2003 | Hachiya |

OTHER PUBLICATIONS

International Preliminary Report on Patentability and Written Opinion of The International Searching Authority issued in International Application No. PCT/US2005/016050, dated Nov. 1, 2007.

* cited by examiner

*Primary Examiner*—Jessica Han
(74) *Attorney, Agent, or Firm*—McDermott Will & Emery LLP

(57) ABSTRACT

A hysteretic regulator may be set to an active mode when voltage at an output falls to a first threshold level. In the active mode, charge is applied to an output node by a current having a set limit value. The regulator is set to an inactive mode when the voltage at the output node rises to a second threshold level. The current limit value is automatically adjusted as a function of average regulator current. An indication of average regulator current may be obtained by charging a sense capacitor during the active mode and discharging the sense capacitor during the inactive mode. The voltage of the sense capacitor, which is representative of the average regulator current, is used to generate an offset adjustment applied to a regulator controller.

18 Claims, 2 Drawing Sheets

ADAPTIVE POWER CONTROL FOR HYSTERETIC REGULATORS

TECHNICAL FIELD

The present disclosure relates to control of regulators, more particularly to switched regulators that can be operated in burst mode.

BACKGROUND

Switching DC/DC power converters designed to be efficient at light loads typically use a hysteretic control technique, sometimes referred to as Burst Mode or Pulse Frequency Mode, to regulate output voltage. In such operation, the converter operates at a fixed power level, usually by regulating a peak inductor current, until the output achieves the desired voltage. The converter then goes into a "sleep" (inactive) operational mode, drawing minimal quiescent current from the power source. During the inactive mode, the load current is supplied only by an output filter capacitor. When the output voltage has dropped by a small amount, typically one to two percent, the converter comes out of the sleep mode and resumes active operation to bring the output voltage back up to the desired value. The cycle of alternating periods of active and inactive operational modes repeats, maintaining the output voltage within the specified hysteretic limits. The time duration of the active, or "wake", time and sleep time varies with the amount of output capacitance and the amount of hysteresis chosen. The percentage of time spent awake or asleep, i.e., duty cycle, varies with load. At its maximum load capability, the converter stays awake one hundred percent of the time.

Typical converter architecture may comprise step-up (boost), step-down (buck) or step-down/step-up (buck-boost) designs. A known "four-switch" buck-boost converter is described, for example, in an October 2001 datasheet for the LTC3440 "Micro-power Synchronous Buck-Boost DC/DC Converter" integrated circuit manufactured by Linear Technology Corporation. During the active mode, an inductor is switched among various circuit configurations to apply charge to the output capacitor. In active burst operation, inductor current traditionally is controlled to vary, cyclically, between fixed upper and lower limits, commonly called peak and valley levels, respectively.

An advantage of burst mode converter operation, as compared to fixed frequency pulse width modulated switching operation, is high efficiency at light loads, because the percentage of time that the converter is asleep increases as the load current diminishes. If the quiescent current of the hysteretic converter can be made very small, typically tens of micro-amps, while in the sleep mode, high efficiency can be maintained until the load current drops to as little as one hundred micro-amps or less. This operation is advantageous for battery powered applications that spend considerable time in an idle state that requires little power.

A disadvantage of the burst mode operation is that the maximum output power that can be delivered is limited by the peak inductor current, which is fixed regardless of load. If the peak inductor current is raised to increase power capability, the converter's conduction losses are increased, which lowers efficiency across the entire load range. Therefore, in a hysteretic converter, a fixed peak inductor current value is chosen as a compromise between efficiency and maximum power capability. If maximum power capability is increased, the increased peak inductor current results in lower efficiency at light loads. Difficulty in sensing load current while maintaining hysteretic operation, presents challenges in departing from fixed peak inductor current operation.

SUMMARY OF THE DISCLOSURE

The subject matter described herein fulfills the above-described needs of the prior art. A DC/DC regulator may be set to an active mode when the voltage at the output falls to a first threshold level. In the active mode, charge is applied to an output node by a current having a set limit value. The regulator is set to an inactive mode when the voltage at the output node rises to a second threshold level. The current limit value is automatically adjusted as a function of average regulator output current.

Preferably, an indication of average regulator output current is obtained by charging a sense capacitor during the active mode of the regulator and discharging the sense capacitor during the inactive mode of the regulator. The voltage of the sense capacitor, which is representative of the average regulator output current, is sensed and converted to a current. A fixed minimum current source is added to the converted current to generate an offset adjustment.

In the active mode, an inductor is switchably coupled to a voltage source to charge a regulator output capacitor, the inductor current being controlled to vary cyclically between maximum (peak) and minimum (valley) levels. Regulator current is sensed and the sensed signal is compared with the offset adjustment. When the sensed current signal attains the offset adjustment value, the current limit value is reached. The current limit value, thus, is varied in accordance with the voltage of the sense capacitor. The adjusted current limit value preferably is the peak inductor current, although a valley current limit may also be adjusted. The current converted from the sense capacitor voltage may be set not to exceed a maximum level.

A power controller, coupled to the converter input and to the inductor, is responsive to output voltage feedback to change between active and inactive modes when the hysteretic thresholds are reached. A power adjust control circuit has an input coupled to the power controller for receiving a signal indicative of the mode of the power controller. A first switch is coupled between a first terminal of a voltage source and a node of the sense capacitor. A second switch is coupled between a second terminal of the voltage source and the node of the sense capacitor. In response to an active mode signal at the power adjust control circuit input, the first switch is closed to charge the capacitor. In response to an inactive mode signal at the input, the second switch is closed to discharge the sense capacitor. The voltage at the sense capacitor node is proportional to the average regulator current.

A voltage to current converter is coupled to the sense capacitor to produce a current representing the average regulator current. Through adder circuitry, a minimum current is added to the output of the voltage to current converter to generate an offset voltage. A comparator has a first input for receiving a sensed inductor current signal, a second input for receiving the offset voltage, and an output coupled to the power controller. In response to the comparator output, the power controller sets the peak current value. A second comparator output may also be used to set the valley current value.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1:
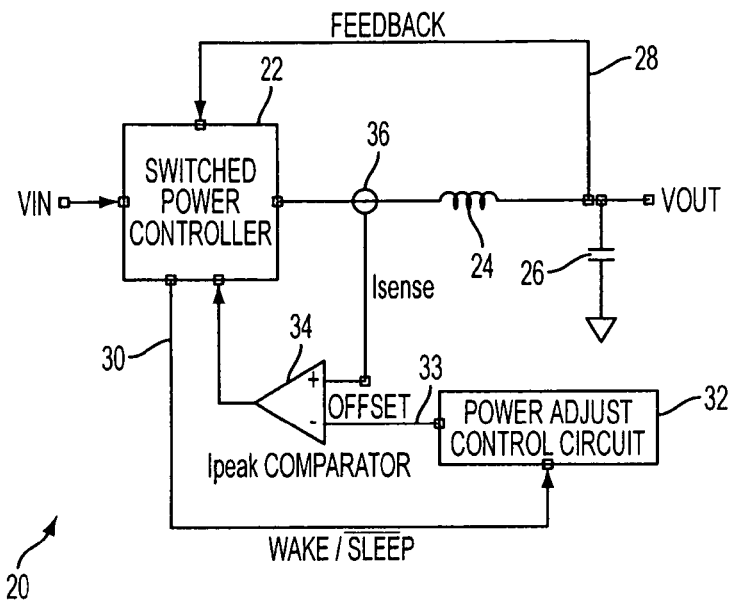
FIG. 1 is a schematic block diagram of a switching regulator in accordance with the present invention.

Switching regulator 20, represented in the schematic block diagram of FIG. 1, receives an input voltage from a power supply at input node $V_{IN}$ and provides a preset output voltage at the $V_{OUT}$ node. Connected in series between the input and output nodes are a switched power controller 22 and inductor 24. Output capacitor 26 is connected between the output node and common connection. Power controller 22 is representative of any known hysteretic burst mode operable switching and control circuitry for driving inductor current cyclically between peak and valley levels during an active state. For example, known buck, boost, and buck-boost hysteretic converter architecture may be employed.

Voltage at the output node is fed back to the power controller as represented schematically by feedback line 28. A voltage divider or well-known equivalent circuit may by used to scale the feedback voltage to meet appropriate design parameters. When the feedback voltage attains the hysteretic thresholds, the controller transitions between the active and inactive modes of operation. The controller 22 outputs a "WAKE/SLEEP" signal on line 30 that is indicative of the mode of operation, the signal applied to an input of power adjust control circuit 32. The signal has a duty cycle that corresponds to the wake/sleep duty cycle of the power controller. Power adjust control circuit 32 outputs an offset signal that is applied to the negative input of comparator 34. A current sensor 36, represented schematically, applies a signal indicative of sensed inductor current to the positive input of comparator 34. Any known current sensing technique may be used to provide the sensed current signal. The output of comparator 34 is applied to an input of switched power controller 22.

Figure 2:
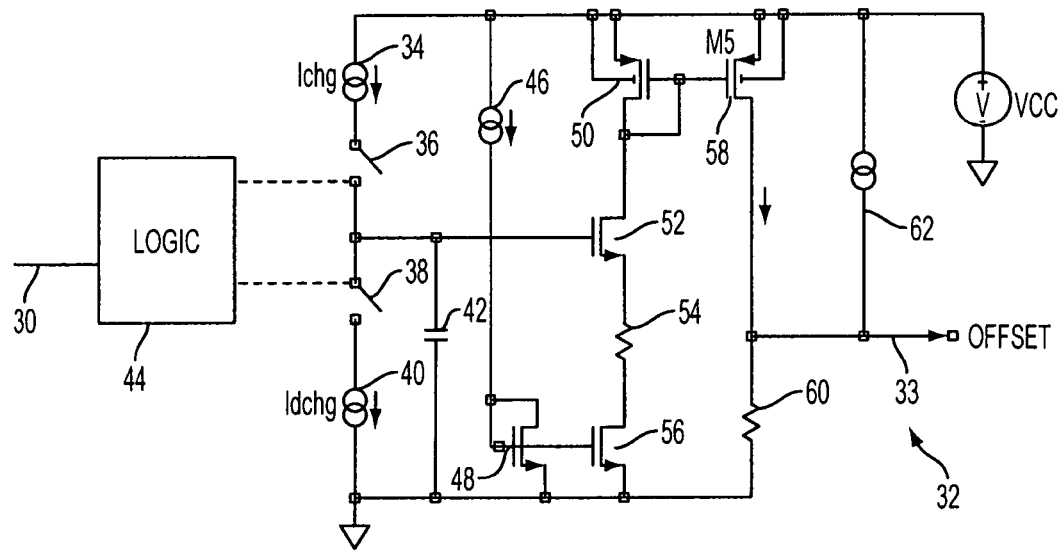
FIG. 2 is a circuit diagram of a power adjust circuit that may be used in the regulator of FIG. 1.

FIG. 2 is a circuit diagram of an exemplified power adjust control circuit 32. Connected between a first voltage source terminal $V_{CC}$ and a common second voltage source terminal are current source 34, controlled switch 36, controlled switch 38, and current source 40. Connected between the junction of switches 36 and 38 and the second voltage source terminal is capacitor 42. Logic circuit 44, which may include a flip-flop or the like, has an input for receiving the "wake/sleep" signal from line 30. A first output of logic circuit 44 is applied to control switch 36. A second output of logic circuit 44 is applied to control switch 38. When the signal at line 30 is indicative of the wake, or active, mode of controller 22, the logic circuit maintains switch 36 closed and switch 38 open. At this time, capacitor 42 is charged from the first voltage source terminal via current source 34 and switch 36. When the signal at line 30 is indicative of the sleep, or inactive, mode of controller 22, the logic circuit maintains switch 38 closed and switch 36 open. At this time, capacitor 42 is discharged via switch 38 and current source 40 to the second voltage source terminal.

Current source 46 and switch 48 are connected in series across the voltage source terminals, as is the series connection of switch 50, switch 52 resistor 54, and switch 56. The upper node of capacitor 42 is connected to the gate of switch 52. The gates of switches 48 and 56 are connected together. Switch 58 is connected in series with resistor 60 across the voltage source terminals. Switches 50 and 58 are connected in a current mirror configuration. Current source 62 is connected between the first voltage source terminal and the junction, output line 33, of switch 58 and resistor 60.

By charging capacitor 42 with a fixed current when the controller is active, and discharging the capacitor with a fixed current when the converter is inactive, a voltage proportional to average load current is produced at the upper node of the capacitor 42. This voltage is fed to a current converter that comprises switch 52 and resistor 54. The maximum current in resistor 54 is limited by current sink switch 56, which is set by current source 46 and switch 48. The current 154 in resistor 54 will be:

$$I_{54}=(V_{42}-V_{SAT(56)}-V_{GS(52)})/R$$

Where $V_{42}$ is the voltage of capacitor 42, $V_{SAT(56)}$ is the voltage across switch 56, $V_{GS(52)}$ is the gate to source voltage of switch 52, and R is the resistance of resistor 54.

The current in resistor 54 is mirrored by current mirror switches 50 and 58 and added to a set minimum current from current source 62 to create an offset output voltage across resistor 60. The maximum value of $I_{54}$ is limited, regardless of whether the voltage at capacitor 42 increases inordinately as a result of a varying $V_{CC}$ supply voltage. The ratio of the discharge current of capacitor 42 to charge current of capacitor 42 will determine the converter operating duty cycle (percentage of wake time) that is required to ramp up the voltage on capacitor 42 and transition to a maximum inductor current.

The use of duty cycle "awake time vs. asleep time" information as an indicator of average load current avoids the complexity of actually measuring the average current directly. In a monolithic IC power converter, the information can be obtained internally, requiring no extra pins or external components. The use of voltage of capacitor 42 to adjust the peak inductor current enables higher peak currents to support heavy loads and lower peak currents for better efficiency at lighter loads. If inductor valley current is adjusted as well as peak current, peak-to-valley inductor current remains relatively constant with load. With such provision, the effect of load variation on switching frequency and output ripple can be minimized.

Figure 3:
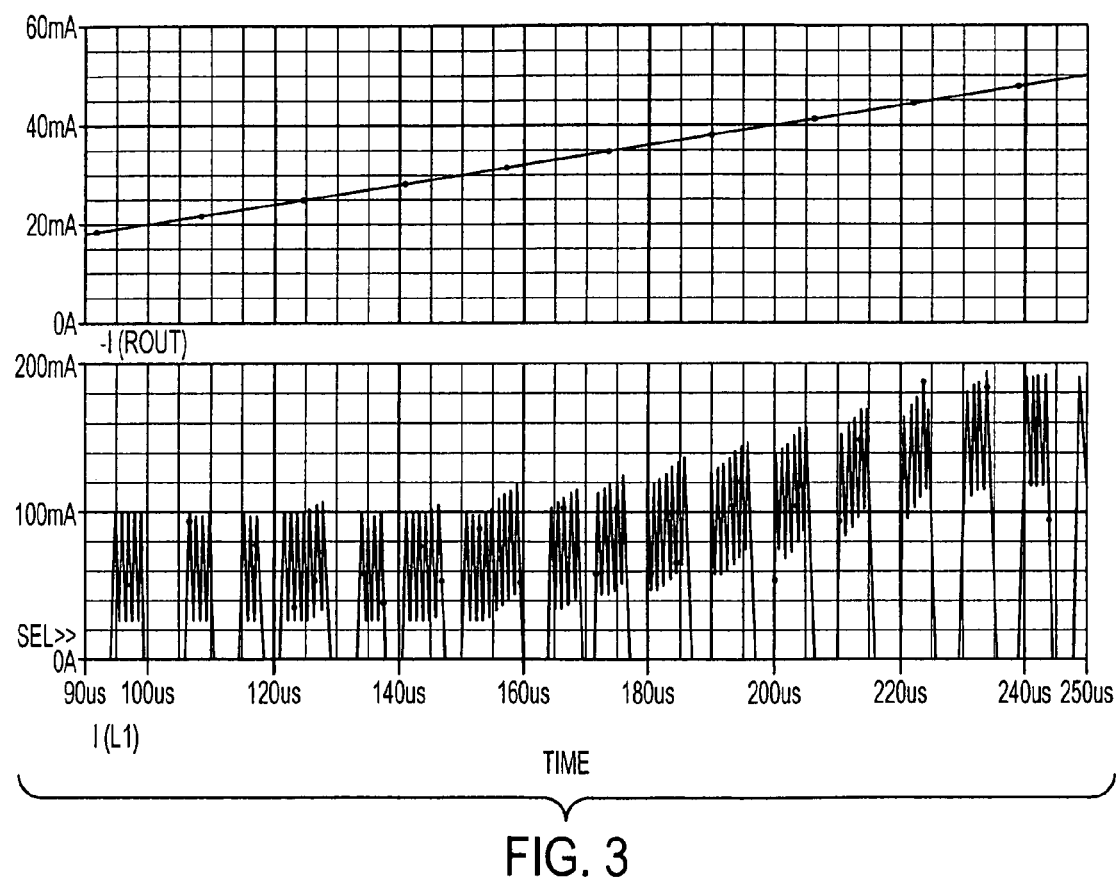
FIG. 3 is a waveform diagram illustrating current waveforms during operation of the present invention.

Typical waveforms, illustrating the inductor current variation with load current, are shown in FIG. 3. In this example, the load current has been ramped up from less than 20 mA to 50 mA. In response to the change in load, the peak inductor current increases from a minimum value of 100 mA to a maximum value of 190 mA. The valley current of the inductor increases from a minimum of 20 mA to a maximum of 120 mA.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the invention can be incorporated as part of a monolithic power converter or implemented in a converter using discrete components. The invention is applicable to any hysteretic converter architecture and not restricted to use at any particular power level.

What is claimed is:

1. A method for controlling a DC/DC regulator comprising the steps of:
    setting the regulator to an active operational mode in which charge is applied to an output node of the regulator by a current having a current limit value when the voltage at the output node falls to a first threshold level;
    setting the regulator to an inactive operational mode when the voltage at the output node rises to a second threshold level; and
    automatically adjusting the current limit value as a function of a duty cycle indicating a percentage of time of the active or inactive operational mode,
    wherein the step of automatically adjusting comprises:
    charging a capacitor during the active operational mode of the regulator;
    discharging the capacitor during the inactive operational mode of the regulator;
    sensing the voltage of the capacitor; and
    varying the current limit value in accordance with the sensed capacitor voltage.

2. A method for controlling a DC/DC regulator comprising the steps of:
    setting the regulator to an active operational mode in which charge is applied to an output node of the regulator by a current having a current limit value when the voltage at the output falls to a first threshold level;
    setting the regulator to an inactive operational mode when the voltage at the output node rises to a second threshold level; and
    automatically adjusting the current limit value as a function of a characteristic of regulator current,
    wherein the step of automatically adjusting comprises:
    charging a capacitor during the active operational mode of the regulator;
    discharging the capacitor during the inactive operational mode of the regulator;
    sensing the voltage of the capacitor; and
    varying the current limit value in accordance with the sensed capacitor voltage.

3. A method as recited in claim 2, wherein the characteristic is average regulator current.

4. A method as recited in claim 2, wherein the step of varying comprises:
    converting the sensed capacitor voltage to a current related thereto;
    adding a fixed minimum current source to the current obtained in the current source to generate an offset adjustment;
    sensing output current of the regulator; and
    comparing the offset adjustment with the sensed output current.

5. A method as recited in claim 4, wherein the step of converting comprises setting a maximum level of converted current.

6. A method as recited in claim 2, wherein the regulator comprises an inductor, and further comprising the step of coupling the inductor to a voltage source so that current through the inductor varies cyclically between maximum (peak) and minimum (valley) levels during the active mode.

7. A method as recited in claim 6, wherein the current limit value that is varied in the varying step is the peak inductor current.

8. A method as recited in claim 6, wherein the current limit value that is varied in the varying step is the valley inductor current.

9. A DC/DC regulator having an input node coupled to a power source and an output node coupled to a load, the regulator comprising:
    an inductor;
    an output capacitor;
    a power controller coupled to the regulator input and to the inductor, the power controller configured to assume an active operational mode to apply charge to the capacitor via current through the inductor in response to the output voltage falling to a first threshold level, and to assume an inactive operational mode in response to the output voltage rising to a second threshold level, the current in the active operational mode limited to a current limit value; and
    an adjustment controller coupled to the power controller for adjusting the current limit value as a function of average load current,
    wherein the adjustment controller comprises:
    a power adjust control circuit having an input coupled to the power controller for receiving a signal indicative of the mode of the power controller and an output for producing an offset; and
    a comparator, having a first input for receiving a sensed inductor current signal, a second input for receiving the offset, and an output coupled to the power controller;
    whereby the current limit value varies in accordance with the offset, wherein
    the power adjust control circuit comprises:
    a second capacitor;
    a first switch coupled between a first terminal of a voltage source and a node of the second capacitor;
    a second switch coupled between a second terminal of the voltage source and the node of the second capacitor; and wherein:
    the first switch is closed during the active mode of the power controller to charge the second capacitor; and
    the second switch is closed during the inactive mode of the power controller to discharge the second capacitor.

10. A DC/DC regulator as recited in claim 9, wherein the power adjust control circuit further comprises:
    a voltage to current converter coupled to the second capacitor to produce a current representing the voltage of the second capacitor; and
    adder circuitry for adding a minimum current to the current produced by the voltage to current converter to generate the offset.

11. A DC/DC regulator as recited in claim 9, wherein the power controller is configured to couple the inductor to the power source so that current through the inductor varies cyclically between maximum (peak) and minimum (valley) levels during the active mode.

12. A DC/DC regulator as recited in claim 11, wherein the current limit value is the peak inductor current level.

13. A DC/DC regulator as recited in claim 11, wherein the current limit value is the valley inductor current level.

14. A DC/DC regulator including an inductor and an output capacitor, comprising:
    a first circuit coupled to an input of the regulator and the inductor, the first circuit configured for selectively setting the regulator to an active operational mode in which charge is applied to an output node of the regulator by a current having a current limit value and an inactive operational mode; and a second circuit configured for charging or discharging a second capacitor depending on whether the regulator is in the active or inactive operational mode, and adjusting the current limit value in response to a voltage of the second capacitor.

15. A DC/DC regulator as recited in claim 14, wherein the first circuit is configured for setting the regulator to the active operational mode when the voltage at the output node falls to a first threshold level, and setting the regulator to the inactive operational mode when the voltage at the output node rises to a second threshold level.

16. A DC/DC regulator as recited in claim 14, wherein the second circuit is configured for adjusting the current limit value as a function of average load current.

17. A DC/DC regulator as recited in claim 14, wherein the second circuit comprises:
a third circuit having an input coupled to the first circuit for receiving a signal indicative of the active or inactive operational mode and an output for producing an offset to be obtained based on the voltage of the second capacitor; and
a comparator, having a first input for receiving a sensed inductor current signal, a second input for receiving the offset, and an output coupled to the setting unit;
whereby the current limit value varies in accordance with the offset.

18. A DC/DC regulator as recited in claim 17, wherein the third circuit further comprises:
a voltage to current converter coupled to the second capacitor to produce a current representing the voltage of the second capacitor; and
adder circuitry for adding a minimum current to the current produced by the voltage to current converter to generate the offset.

* * * * *